(12) United States Patent
Mizuno et al.

(10) Patent No.: US 7,053,016 B2
(45) Date of Patent: May 30, 2006

(54) CERAMIC POROUS BODY AND METHOD OF MANUFACTURING GLASS USABLE AS BINDER THEREFOR

(75) Inventors: Takahiro Mizuno, Chita (JP); Manabu Isomura, Tsushima (JP); Tomonori Takahashi, Chita (JP)

(73) Assignee: NGK Insulators, Ltd., Nagoya (JP)

( * ) Notice: Subject to any disclaimer, the term of this patent is extended or adjusted under 35 U.S.C. 154(b) by 135 days.

(21) Appl. No.: 10/308,507

(22) Filed: Dec. 3, 2002

(65) Prior Publication Data

US 2003/0114293 A1 Jun. 19, 2003

(30) Foreign Application Priority Data

Dec. 7, 2001 (JP) ............................. 2001-374767
Nov. 6, 2002 (JP) ............................. 2002-322030

(51) Int. Cl.
*C03C 17/22* (2006.01)
(52) U.S. Cl. ............................. 501/32; 501/80; 501/85
(58) Field of Classification Search ................ 501/80, 501/32, 85
See application file for complete search history.

(56) References Cited

U.S. PATENT DOCUMENTS

| | | | | |
|---|---|---|---|---|
| 3,993,495 | A | * | 11/1976 | Galliath et al. ................ 501/80 |
| 4,871,495 | A | * | 10/1989 | Helferich et al. ............. 264/43 |
| 4,983,423 | A | | 1/1991 | Goldsmith |
| 5,039,629 | A | * | 8/1991 | Kakligian ..................... 501/32 |
| 5,106,502 | A | | 4/1992 | Goldsmith |
| 5,348,915 | A | * | 9/1994 | Thometzek .................. 501/24 |
| 5,817,586 | A | * | 10/1998 | Harada et al. ................. 501/17 |
| 5,939,343 | A | * | 8/1999 | Tunker et al. ................. 501/17 |
| 6,818,579 | B1 | * | 11/2004 | Giangrasso ................... 501/80 |

FOREIGN PATENT DOCUMENTS

| | | | |
|---|---|---|---|
| EP | 0 850 680 A1 | | 7/1998 |
| JP | 55-95668 | | 7/1980 |
| JP | 64-45785 | | 2/1989 |
| JP | 01108178 | * | 4/1989 |
| JP | 1-199618 | | 8/1989 |
| JP | 6-256069 | | 9/1994 |
| JP | 63-274407 | | 11/1998 |
| JP | 2001122658 | * | 5/2001 |
| JP | 2003198143 | * | 7/2003 |
| JP | 2003168548 | * | 6/2005 |
| KR | 9606856 | * | 5/1996 |

OTHER PUBLICATIONS

"Enhancement of bone regeneration using resorbable ceramics and a polymer ceramic composite material" Schliephake et al. Journal of Biomedical Mat'ls Research 2001, 56(1), 128-136.*
"Bioactive glass ceramics materials for bone substitutes" Brovarone et al.□□Ceramic Engineering and Science Proceedings (2002), 23(4), 839-844.*
M. Szafran, "Effect of Addition of a Binder on Properties of Porous Ceramic Filtering Materials from Synthetic Corundum," Ceramics 50, Polish Ceramics Bulletin 12, Modern Ceramic Materials Testing Methods, 1995, pp. 127-133.

* cited by examiner

*Primary Examiner*—Paul Marcantoni
(74) *Attorney, Agent, or Firm*—Burr & Brown

(57) ABSTRACT

A ceramic porous body is provided which uses a binder made of a glass that has excellent acid resistance and alkali resistance and which can be used for a long period of time as a filtration filter. The ceramic porous body is formed from ceramic particles that are bonded using a glass binder comprising 5 to 20 mol % of a plurality of metal oxides, selected from the group consisting of $Li_2O$, $Na_2O$, $K_2O$, MgO, CaO, SrO and BaO and containing at least two alkali metal oxides selected from the group consisting of $Li_2O$, $Na_2O$ and $K_2O$ as an essential component, at least 3 mol % of at least one of $ZrO_2$ and $TiO_2$ as a total amount, and $SiO_2$ and incidental impurities as the balance.

3 Claims, No Drawings

CERAMIC POROUS BODY AND METHOD OF MANUFACTURING GLASS USABLE AS BINDER THEREFOR

This application claims the benefit of Japanese Application Nos. 2001-374767, filed Dec. 7, 2001 and 2002-322030, filed Nov. 6, 2002, the entireties of which are incorporated herein by reference.

BACKGROUND OF THE INVENTION AND RELATED ART STATEMENT

The present invention relates to a ceramic porous body usable as a filter capable of filtering fluids such as liquids, gases and the like.

Ceramic filters are used for water treatment, exhaust gas treatment, and the removal of floating substances, bacteria, dusts, etc. in liquids and gases in various fields inclusive of medicine and foodstuff industries, since they have excellent physical strength, durability and corrosion resistance.

A ceramic porous body used for a ceramic filter as a substrate, a filtration membrane or an intermediate membrane for forming a filtration membrane, is formed by directly sintering ceramic particles, firing ceramic particles after adding a sintering aid to the ceramic particles, and firing the ceramic particles which are bonded with a vitreous binder, or the like. As an example of a glass fit desirable for a binder of this kind of porous body, there is proposed in JP-B-6-67460 a glass frit which is a compound mixture of a borosilicate and an alkaline flux with rare earth metal oxides and contains zirconia in a high level.

In the case that when a ceramic porous body is used, for example, in a filtration filter for water purification, it is periodically required to subject the ceramic porous body to chemical cleaning to remove clogs. Such cleaning is typically performed by decomposing organic substances with an alkaline sodium hypochloride solution, and treating inorganic substances with an acidic citric acid solution. Thus, in this cleaning, the ceramic porous body is alternately exposed to acid and alkali, and, thus, corrosion resistance against both acids and alkalis is required for a binder of the ceramic porous body.

However, the glass frit described in JP-B-6-67460 is poor in alkali resistance since it contains $B_2O_3$. Furthermore, in general, borosilicate glasses including the above glass frit have low resistance against at least either of acids and alkalis.

Therefore, ceramic porous bodies in which a conventional glass frit is used as a binder could not be used as filtration filters for a long period under circumstances where ceramic porous bodies are exposed to acid treatment and alkali treatment, repeatedly.

SUMMARY OF THE INVENTION

The present invention has been completed in view of such conventional circumstances as described above, and an object of the present invention is to provide a ceramic porous body produced by using a binder which is a glass excellent both in acid resistance and alkali resistance so as to enable to use the ceramic porous body for a long period of time as a filtration filter, and the like, even under the conditions that the ceramic porous body is subjected to both acid and alkali treatment, repeatedly.

According to the present invention, there is provided a ceramic porous body formed from ceramic particles bonded by a binder which is a glass containing 5 to 20 mol % of a plurality of metal oxides selected from the group consisting of $Li_2O$, $Na_2O$, $K_2O$, $MgO$, $CaO$, $SrO$ and $BaO$ and contain at least two alkali metal oxides selected from the group consisting of $Li_2O$, $Na_2O$ and $K_2O$, 3 mol % or more of either or both of $ZrO_2$ and $TiO_2$ as a total amount, and $SiO_2$ and unavoidable impurities as a balance. It is preferable that the glass consists essentially of the plurality of metal oxides including at least two alkali metal oxides selected from the group consisting of $Li_2O$, $Na_2O$ and $K_2O$ in any combination as an essential component, 3 mol % or more of either or both of $ZrO_2$ and $TiO_2$ as a total amount, and $SiO_2$ and unavoidable impurities as a balance.

Also, according to the present invention, there is provided a method of manufacturing a glass comprising the steps of mixing a silica sol to a glass frit containing 10 to 20 mol % of a plurality of metal oxides including at least the alkali metal oxides mentioned above as an essential component, and firing the thus obtained mixture, whereby eventually a glass containing 5 to 20 mol % of the metal oxides may be obtained.

Furthermore, according to the present invention, there is provided a ceramic porous body comprising ceramic particles bonded by using a binder which is a glass manufactured by the above-described manufacturing method.

Still furthermore, according to the present invention, there is provided a method of manufacturing a multi-layered ceramic filter comprising the steps of forming a porous intermediate membrane on a surface of a porous substrate, and further forming a filtration membrane on a surface of the intermediate membrane, wherein the intermediate membrane is formed on the surface of the substrate using a slurry containing silica sol, the filtration membrane is formed on the surface of the intermediate membrane using a slurry for the filtration membrane, and the multi-layered body that is obtained by drying is then fired.

DETAILED DESCRIPTION OF THE INVENTION

In a ceramic porous body according to the present invention, a glass which serves as a binder for bonding ceramic particles contains 5 to 20 mol %, preferably 5 to 14 mol % of a plurality of metal oxides selected from the group consisting of $Li_2O$, $Na_2O$, $K_2O$, $MgO$, $CaO$, $SrO$ and $BaO$ and contains at least two alkali metal oxides selected from the group consisting of $Li_2O$, $Na_2O$ and $K_2O$.

If the total content of these metal oxides exceeds 20 mol %, corrosion resistance becomes insufficient. If this total is less than 5 mol %, the $SiO_2$ content becomes too high, and this usually results in the reduction of alkali resistance. Incidentally, when the total content of the above-described metal oxides is less than 10 mol %, vitrification itself is difficult in usual methods of manufacturing glass based on the use of a furnace having a firing temperature of about 1600° C. However, as will be described later, it is possible to obtain a glass with a metal oxide content of less than 10 mol % by mixing a silica sol with a glass frit having a total metal oxide content of 10 mol % or more and firing a mixture thus obtained.

Furthermore, in a ceramic porous body according to the present invention, the at least two alkali metal oxides selected from among $Li_2O$, $Na_2O$ and $K_2O$ are indispensable components. However, by further adding alkaline earth metal oxides such as $MgO$, $CaO$, $SrO$ and $BaO$, the elution of glass components in an acid solution may be suppressed.

In particular, MgO and CaO are very effective in improving corrosion resistance and, therefore, it is preferred that either of the two be included.

It is preferred that, in any combination of the at least two alkali metal oxides selected from among $Li_2O$, $Na_2O$ and $K_2O$ contained in the present glass, the amount of an alkali metal oxide of the largest content in the combination does not exceed twice the amount of an alkali metal oxide of the lowest content in the combination, in terms of molar ratio. In particular, when the contents of these alkali metal oxides are equimolar, the elution of glass components in an acid solution is suppressed by the mixed alkali effect and corrosion resistance is improved.

A glass which serves as a binder contains 3 mol % or more of either or both of $ZrO_2$ and $TiO_2$ as a total amount. Due to the presence of these components, the framework of the glass is strengthened and the elution of glass components in an acid solution is suppressed, thereby the corrosion resistance is improved. Incidentally, usually it is difficult to obtain sufficient corrosion resistance when the content of these components is less than 6 mol %. However, when either or both of $ZrO_2$ and $TiO_2$ are contained in a total amount of 3 mol % or more, necessary corrosion resistance may be attainable in a case where a final content of the above-described metal oxides is relatively lowered by a glass manufacturing method that involves mixing a silica sol and firing the obtained mixture, which is described more detail below. Furthermore, because too much of these components results in the formation of a crystal phase instead of vitrification, it is preferred that the maximum content be around 12 mol % or so.

The balance of the glass is $SiO_2$ and unavoidable impurities and, does not contain $B_2O_3$ in principle, which causes a deterioration in alkali resistance, with the exception of a trace amount (less than 1 mol %) of $B_2O_3$ contained as an unavoidable impurity. Therefore, alkali resistance is drastically improved compared to a case where the above-described conventional glass frit and borosilicate glass are used as a binder.

The kind and size of the ceramic particles which serve as aggregates of a the ceramic porous body of the present invention vary with the intended use. For example, when the ceramic particles are used in an intermediate membrane of a filtration filter for water purification, alumina particles with an average diameter of 3 μm are preferably used.

In the ceramic porous body of the present invention, as described above, a glass with improved acid resistance and alkali resistance is used as a binder. Therefore, the ceramic porous body of the present invention can be used for a long period of time as a filtration filter under conditions where the ceramic porous body is repeatedly subjected to acid treatment and alkali treatment. Furthermore, when the ceramic porous body of the present invention is used as a ceramic filter, the ceramic porous body can be used as a substrate, a filtration membrane of the filter or as an intermediate membrane for forming the filtration membrane.

Next, as an example of a method of forming the glass that is used as a binder for such a ceramic porous body, a suitable method for obtaining a glass having an especially low metal oxide content will be described below. In this method, by mixing a silica sol with a glass frit containing 10 to 20 mol % of a plurality of metal oxides including the alkali metal oxides mentioned above as an essential component and firing the obtained mixture, eventually a glass containing 5 to 20 mol % of the above-described metal oxides is obtained.

As described above, when the total content of the plurality of metal oxides including at least two alkali metal oxides selected from among $Li_2O$, $Na_2O$ and $K_2O$ as an essential component is below 10 mol %, vitrification itself is difficult and, therefore, in the usual methods of manufacturing glass based on the use of a furnace having a firing temperature of about 1600° C., it is difficult to obtain a glass with such a chemical composition. Therefore, in the present manufacturing method, a glass flit having a metal oxide content of 10 to 20 mol % capable of being manufactured in a usual method of manufacturing glass as described above is first obtained, a silica sol is mixed with this glass flit and the thus obtained mixture is fired, whereby a glass having a lower metal oxide content is obtained compared with the original glass flit. According to this manufacturing method, it is possible to obtain a glass having a lower metal oxide content than conventional glasses and a proportionally increased $SiO_2$ content and that provides better corrosion resistance.

A ceramic porous body formed by bonding ceramic particles by virtue of a binder which is a glass having high corrosion resistance manufactured by the present manufacturing method shows excellent acid resistance and alkali resistance under the conditions that the ceramic porous body is subjected repeatedly to acid treatment and alkali treatment, and thus it is suitably used as a filtration filter and the like.

Next, an example of a method of manufacturing a multilayer filter will be described below. In this filter of multilayer construction, a ceramic porous body, which is formed by use of a binder which is a glass whose corrosion resistance is increased as described above by mixing a silica sol and lowering a metal oxide content, is used as an intermediate membrane of the filter. The present manufacturing method comprises the steps of forming a porous intermediate membrane on a surface of a porous substrate and further forming a filtration membrane on a surface of the intermediate membrane. Concretely, an intermediate membrane is first formed on a surface of a substrate by use of a slurry containing a silica sol, a filtration membrane is formed on a surface of the intermediate membrane by use of a slurry and a the laminate that is obtained by drying is then fired.

In the intermediate membrane slurry used in this manufacturing method, a silica sol is added in addition to the ordinary components, such as ceramic particles (aggregate particles), glass frit and water. By adding a silica sol in this manner, it is possible to eventually lower the relative metal oxide content in the glass which bonds the aggregate particles to thereby obtain a binder having a higher corrosion resistance.

Furthermore, when an intermediate membrane is formed on a surface of a substrate using a slurry containing such a silica sol, as described above, and dried (for example, at 80° C. for about 12 hours), the silica sol becomes a dried gel and the dried membrane displays water resistance and does not easily lose its shape even it is wetted with water. Therefore, when this membrane is used as an intermediate membrane, it is possible to form a filtration membrane on its surface without firing after drying and hence the frequency of firing can be reduced. As a matter of course, it is also possible to form a filtration membrane alter the firing of the intermediate membrane. Furthermore, it is also possible to form an intermediate membrane or filtration membrane on a substrate in an unfired condition by performing drying if the silica sol has been mixed with the substrate prior to the firing of the substrate.

In order to increase the efficiency of mixing the silica sol with a slurry for intermediate membrane, it is preferred that the sol be so large as to have a particle diameter of 50 to 100 μm. Furthermore, when higher water resistance is expected after drying, it is desirable to use a sol having a strong bonding force. Moreover, one may mix a sol having such a large particle diameter with a sol having a strong bonding force.

Incidentally, and also in the case of a membrane which has been fired once, it is possible to increase the silica concentration of the binder by completely immersing the membrane in the silica sol and firing it again. Usually, when a ceramic porous body is used as a filtration filter for water purification, it is necessary to seal the ends of the membrane, which is this porous body, with glass etc. However, chemical solutions used for cleaning filters are apt to remain near the end seals and, therefore, higher corrosion resistance than in usual membrane parts may sometimes be required of the end seals. In such a case, it is also possible to adopt a method which involves firing, with only the ends immersed in a silica sol after film formation and drying, or after film formation and firing so as to increase silica content of a glass as a binder at the ends. However, when immersion in a silica sol is performed later as in the above-described example, all of the silica may not be taken into the glass as a binder.

The present invention will be described in detail on the basis of examples. However, the invention is not limited by these examples.

The raw materials for the oxides shown in the following Table 1 were mixed at the respective ratios shown in the table, melted at 1600° C., and ground to form frit with an average particle diameter of 1 μm. Alumina particles having an average particle diameter of 3 μm which serve as aggregates and the frit thus obtained were mixed together at 100:14 (weight ratio) with addition of water to prepare a slurry. One may add a dispersant and a filtration-resisting agent to the above-mentioned mixture, as required.

However, in Examples 7 and 8, a silica sol (average particle diameter 10 mm) was further mixed with the above-described slurry and the chemical compositions in the Table indicate the glass compositions used as the final binders. The glass compositions of this portion can be quantitatively determined by an Energy Dispersion Spectroscopy (EDS) attached to a scanning electron microscope etc. In these examples, the glass compositions were obtained by eliminating Al peak derived from the alumina particles of aggregates from EDS spectrums of membrane surfaces and quantitatively analyzing the spectrums of remaining Si, Zr, Na, K, Mg and Ca. However, the Li content was estimated from the relationship between charges of Li, Na and K and values of Na and K quantitatively determined by EDS because Li cannot be analyzed directly by EDS. In Comparative Example 6, no frit was used and a slurry was obtained by mixing alumina particles and a silica sol.

As a substrate on which a ceramic membrane (a membrane of a ceramic porous body) is formed, a flat alumina plate having an average pore diameter of 10 μm measured by the mercury injection method, an outside diameter of 30 mm and a thickness of 3 mm was prepared, and a membrane was formed on this flat alumina plate using the above-described respective slurry by the filtration membrane forming method. The time for forming the filtration membrane was adjusted so that the thickness of the membrane became 150 μm. After membrane formation, heat treatment was carried out in an electric furnace for treatment in the air at 950° C. for an hour at a temperature rise and fall rate of 100° C./hour and ceramic membranes thus obtained were subjected to a corrosion resistance test.

In the corrosion resistance test, a citric 2% aqueous solution and a sodium hypochloride aqueous solution with an effective chloride concentration of 5000 ppm were used as chemical solutions. A ceramic membrane was alternately and repeatedly immersed each for 6 hours in these chemical solutions whose temperature was adjusted to 30° C. and after a repetition of 20 times Vickers hardness was measured.

An applied load of 100 gf and a loading time of 10 seconds were used as the measuring conditions of Vickers hardness; measurements were carried out at 10 points in each measurement, and average values of these measurements were adopted. Incidentally, the initial hardness of ceramic membranes was 100 and the hardness was the same in all ceramic membranes formed from any kinds of frit. The test results are as shown in Table 1.

TABLE 1

|  | Comparative Example 1 | Comparative Example 2 | Comparative Example 3 | Example 1 | Example 2 | Example 3 | Example 4 |
|---|---|---|---|---|---|---|---|
| $SiO_2$ | 59% | 72% | 74% | 77% | 77% | 76% | 78% |
| $Al_2O_3$ | 0% | 6% | 0% | 0% | 0% | 0% | 0% |
| $TiO_2$ | 5% | 0% | 0% | 0% | 0% | 0% | 0% |
| $ZrO_2$ | 4% | 0% | 5% | 8% | 8% | 10% | 10% |
| $Li_2O$ | 0% | 0% | 5% | 2% | 4% | 2% | 4% |
| $Na_2O$ | 14% | 4% | 15% | 8% | 4% | 7% | 4% |
| $K_2O$ | 2% | 0% | 1% | 2% | 4% | 2% | 4% |
| MgO | 0% | 0% | 0% | 0% | 0% | 0% | 0% |
| CaO | 0% | 0% | 0% | 0% | 0% | 0% | 0% |
| $B_2O_3$ | 16% | 18% | 0% | 0% | 0% | 0% | 0% |
| Hardness | <10 | <10 | 10 | 40 | 50 | 50 | 60 |
| Judgement | x | x | x | Δ | Δ | Δ | ○ |

|  | Example 5 | Example 6 | Comparative Example 4 | Comparative Example 5 | Example 7 | Example 8 | Comparative Example 6 |
|---|---|---|---|---|---|---|---|
| $SiO_2$ | 78% | 76% | 71% | 83% | 86% | 11% | 100% |
| $Al_2O_3$ | 0% | 0% | 0% | 0% | 0% | 0% | 0% |
| $TiO_2$ | 5% | 0% | 0% | 0% | 0% | 0% | 0% |
| $ZrO_2$ | 5% | 10% | 8% | 8% | 5% | 3.5% | 0% |
| $Li_2O$ | 4% | 4% | 7% | 3% | 2% | 1.5% | 0% |
| $Na_2O$ | 4% | 4% | 7% | 3% | 2% | 1.5% | 0% |

TABLE 1-continued

| | | | | | | | |
|---|---|---|---|---|---|---|---|
| K$_2$O | 4% | 4% | 7% | 3% | 2% | 1.5% | 0% |
| MgO | 0% | 1% | 0% | 0% | 0.5% | 0.5% | 0% |
| CaO | 0% | 1% | 0% | 0% | 0.5% | 0.5% | 0% |
| B$_2$O$_3$ | 0% | 0% | 0% | 0% | 0% | 0% | 0% |
| Hardness | 60 | 70 | 20 | — | 70 | 50 | 10% |
| Judgement | ○ | ⊙ | x | x | ⊙ | Δ | x |

All the figures in % in the table indicate molar percentage as oxides.

From a comparison between Comparative Examples 1 and 2 and Example 1, it is apparent that corrosion resistance becomes worse remarkably when a binder contains B$_2$O$_3$. Furthermore, from a comparison between Comparative Example 3 and Examples 7 and 8, it is apparent that corrosion resistance is insufficient with ZrO$_2$ contents of 5 mol % or so when the contents of metal oxides such as Li$_2$O, Na$_2$O, K$_2$O, MgO, CaO are 10 mol % or more in total, whereas sufficient corrosion resistance is obtained even with ZrO$_2$ contents of 3 to 5 mol % or so when the contents of metal oxides as described above are below 10 mol % in all. Moreover, from a comparison between Examples 1 and 3, it is apparent that corrosion resistance is further improved when the ZrO$_2$ content is 9 mol % or more.

From a comparison between Examples 1 and 2 and a comparison between Examples 3 and 4, it is apparent that corrosion resistance is improved by making the contents of the alkali metal oxides equimolar. Also from a comparison between Examples 4 and 5, it is apparent that a similar effect can be expected by using TiO$_2$ in place of ZrO$_2$.

From a comparison between Examples 4 and 6, it is apparent that corrosion resistance is further improved by adding MgO and CaO. Also from a comparison between Examples 3 and 6, it is apparent that corrosion resistance is further improved by making the contents of the alkali metal oxides equimolar and further adding MgO and CaO.

Incidentally, corrosion resistance was insufficient in Comparative Example 4 in which the total content of the alkali metal oxides exceeds 20 mol %, and vitrification did not occur in Comparative Example 5 in which the total content of the alkali metal oxides is below 10 mol %. From this fact, it is evident that it is preferable that alkali metal oxides are contained in a total amount of 10 to 20 mol %. However, from Examples 7 and 8 it is apparent that in a case where the method by which a glass frit is mixed with a silica sol is adopted, even when the total content of the alkali metal oxides is below 10 mol %, desirable results are obtained as far as the total amount of metal oxides, such as Li$_2$O, Na$_2$O, K$_2$O, MgO, CaO, is 5 mol % or so. Incidentally, as is apparent from the result of Comparative Example 6, corrosion resistance is very low when only SiO$_2$ is contained and the alkali metal oxides are not contained.

As described above, a ceramic porous body of the invention can be used for a long period of time as a filtration filter etc. even under the conditions that the ceramic porous body is repeatedly subjected to acid treatment and alkali treatment because the ceramic porous body uses a glass excellent in acid resistance and alkali resistance as a binder for bonding ceramic particles which are aggregates. Furthermore, a method of manufacturing a glass of this invention is suitable for a method of manufacturing a glass which serves as a binder of the above-described ceramic porous body. In particular, this method has an advantage in that it is possible to obtain a glass of higher corrosion resistance which has a lower metal oxide content than with conventional methods and an increased SiO$_2$ content raised proportionally to the reduced content of the metal oxides. In addition, according to the method of manufacturing a filter of the invention, it is possible to improve the corrosion resistance of a glass which is a binder of an intermediate membrane and besides it is also possible that after the formation and drying of an intermediate membrane, a filtration membrane is formed on a surface of the intermediate membrane without firing the intermediate membrane. Therefore, it is possible to reduce the frequency of firing necessary for the completion of a filter.

What is claimed is:

1. A ceramic porous body formed from ceramic particles bound together by a glass binder consisting essentially of 5 to 20 mol % of metal oxides selected from the group consisting of Li$_2$O, Na$_2$O, K$_2$O, MgO, CaO, SrO and BaO and containing at least two alkali metal oxides selected from the group consisting of Li$_2$O, Na$_2$O and K$_2$O as an essential component, at least 3 mol % of ZrO$_2$, and SiO$_2$ and unavoidable impurities as a balance.

2. The ceramic porous body according to claim 1, wherein said glass at least contains one of MgO and CaO.

3. The ceramic porous body according to claim 1, wherein said ceramic porous body is used as a filtration filter under conditions that said ceramic porous body is repeatedly subjected to acid treatment and alkali treatment.

* * * * *